(12) United States Patent
Chiu

(10) Patent No.: US 10,984,802 B2
(45) Date of Patent: Apr. 20, 2021

(54) SYSTEM FOR DETERMINING IDENTITY BASED ON VOICEPRINT AND VOICE PASSWORD, AND METHOD THEREOF

(71) Applicants: Inventec (Pudong) Technology Corporation, Shanghai (CN); Inventec Corporation, Taipei (TW)

(72) Inventor: Chaucer Chiu, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 197 days.

(21) Appl. No.: 16/057,172

(22) Filed: Aug. 7, 2018

(65) Prior Publication Data

US 2019/0378520 A1 Dec. 12, 2019

(30) Foreign Application Priority Data

Jun. 8, 2018 (CN) .......................... 201810587999.2

(51) Int. Cl.
| | |
|---|---|
| *G10L 17/24* | (2013.01) |
| *G10L 15/08* | (2006.01) |
| *G10L 17/26* | (2013.01) |
| *G10L 25/63* | (2013.01) |

(52) U.S. Cl.
CPC .............. *G10L 17/24* (2013.01); *G10L 15/08* (2013.01); *G10L 17/26* (2013.01); *G10L 25/63* (2013.01); *G10L 2015/088* (2013.01)

(58) Field of Classification Search
USPC .................................. 704/246, 247, 251, 252
See application file for complete search history.

(56) References Cited

U.S. PATENT DOCUMENTS

| | | | | |
|---|---|---|---|---|
| 2012/0278073 | A1* | 11/2012 | Weider ................ | G10L 15/1815 704/235 |
| 2015/0012453 | A1* | 1/2015 | Odinak .................... | G06F 40/10 705/321 |
| 2019/0182176 | A1* | 6/2019 | Niewczas ............. | H04L 47/803 |
| 2019/0206396 | A1* | 7/2019 | Chen ........................ | G10L 15/30 |

* cited by examiner

*Primary Examiner* — Leonard Saint Cyr
(74) *Attorney, Agent, or Firm* — David R. Stevens; Stevens Law Group

(57) ABSTRACT

A system of determining identity based on voiceprint and voice password, and a method thereof are disclosed. In the method, after the voice signal is received, the judgment result of the voiceprint of the voice signal and the judgment result of the content of the voice signal are used to determine whether to pass the verification, and this technical solution of the present invention can confirm that the voice, identified based on the voiceprint thereof, is made by a real person, so as to improve the security of identity determination.

3 Claims, 3 Drawing Sheets

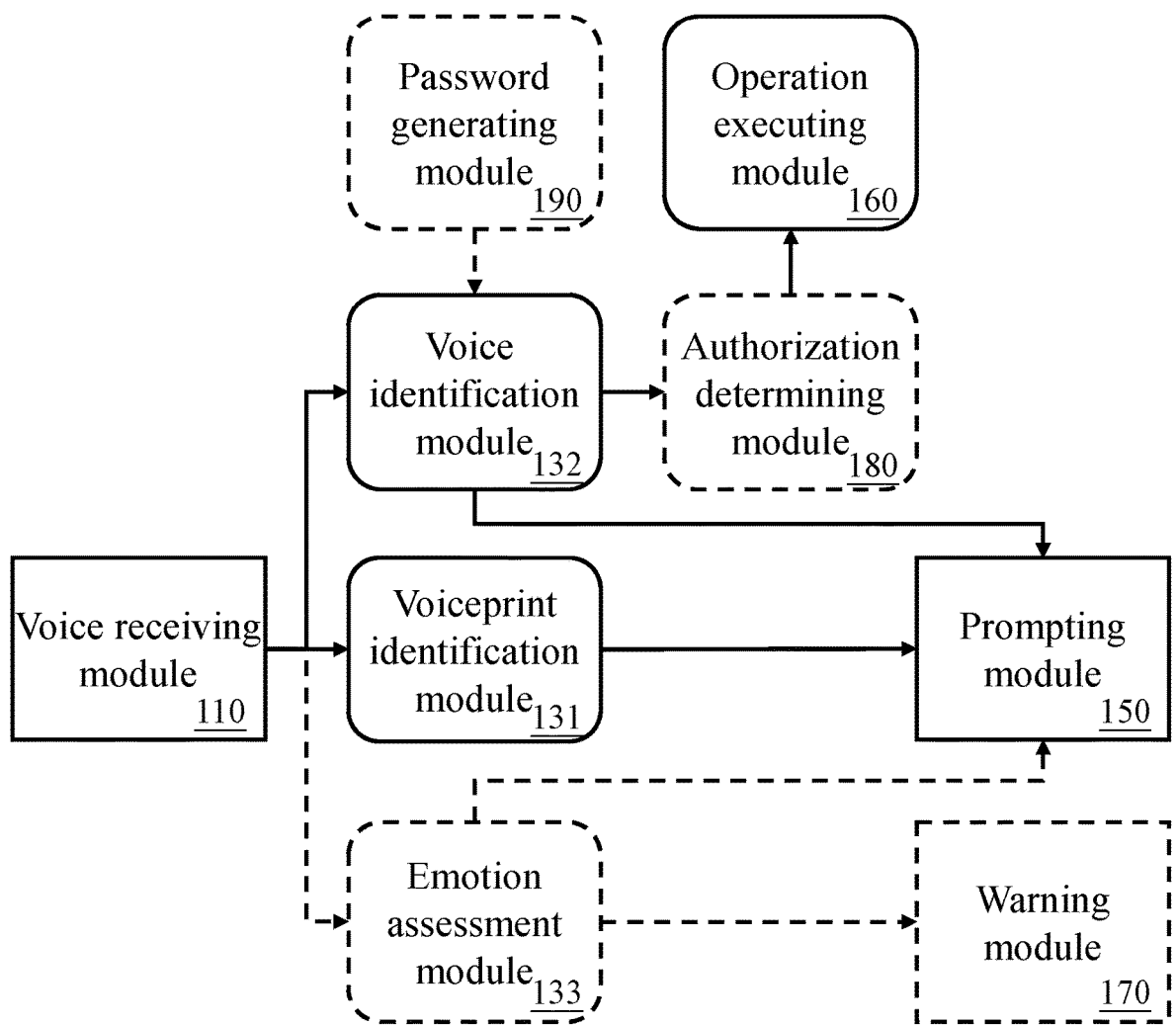
[FIG. 1]

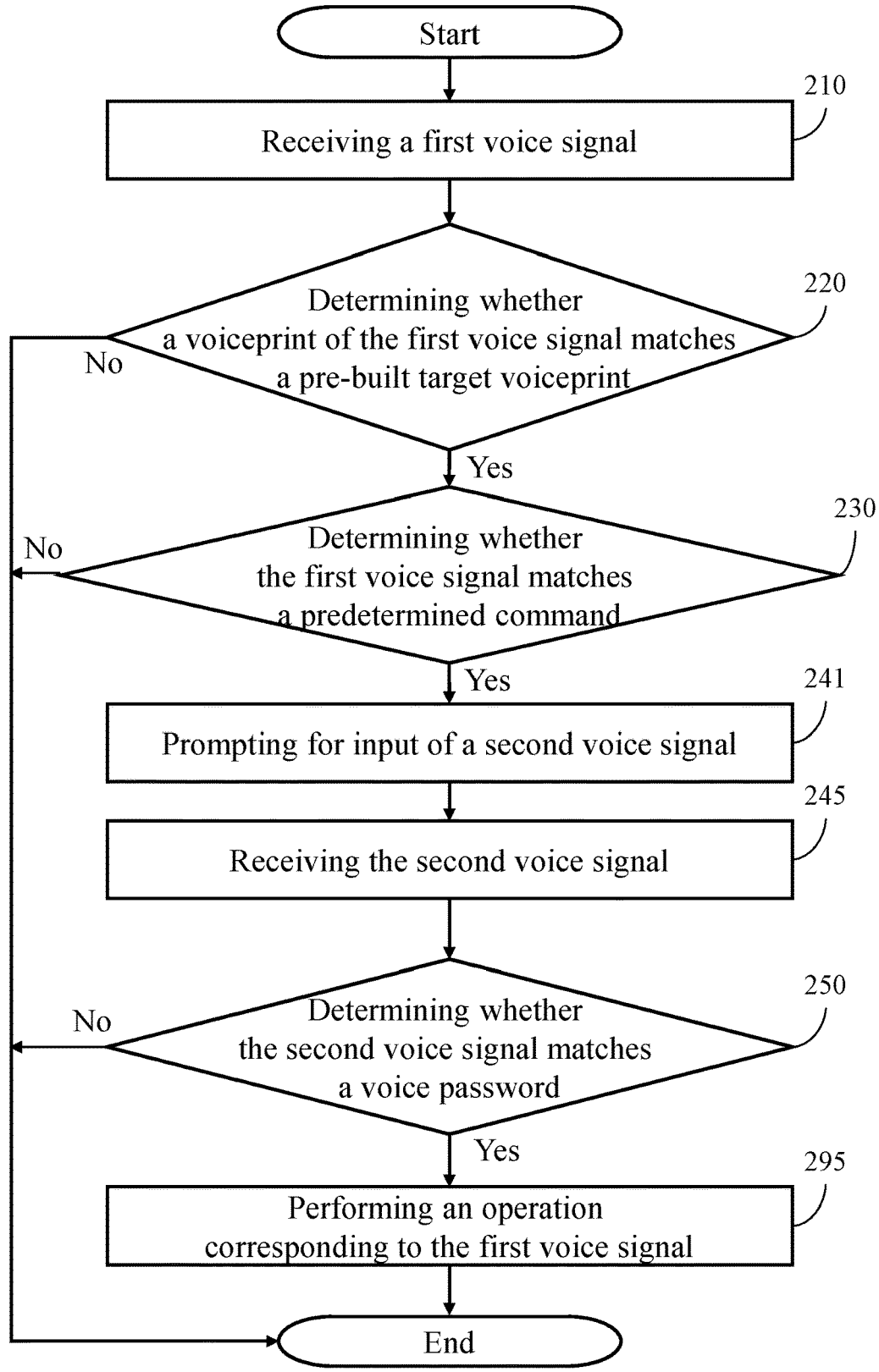
[FIG. 2A]

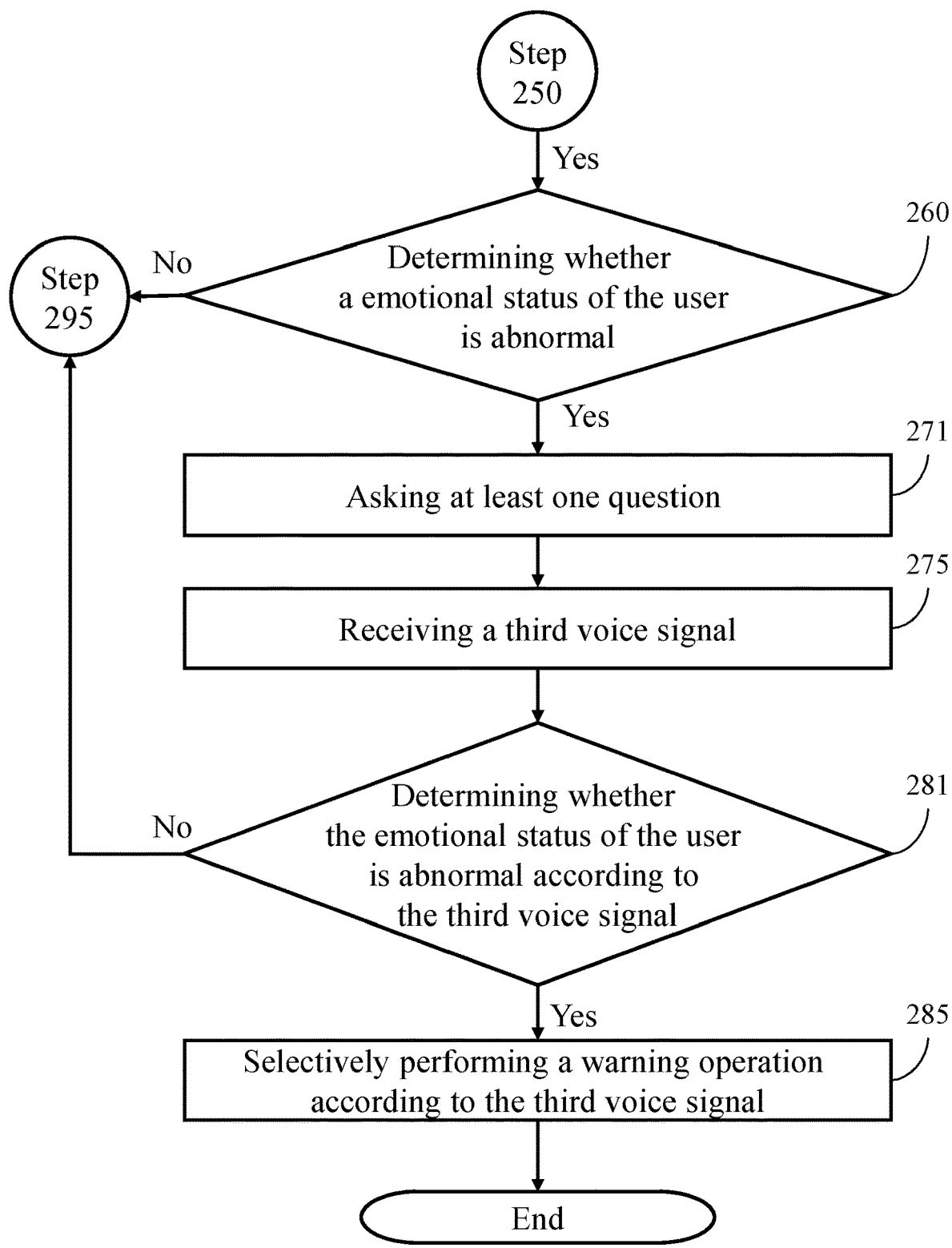
[FIG. 2B]

SYSTEM FOR DETERMINING IDENTITY BASED ON VOICEPRINT AND VOICE PASSWORD, AND METHOD THEREOF

CROSS-REFERENCE TO RELATED APPLICATION

This application claims the benefit of Chinese Patent Application No. 201810587999.2, filed Jun. 8, 2018.

BACKGROUND OF THE INVENTION

1. Field of the Invention

The present invention generally relates to an identity determination system and a method thereof, more particularly to a system for determining identity based on voiceprint and voice password, and a method thereof.

2. Description of the Related Art

Voiceprint is a kind of acoustic spectrum which can be measured by instrument and carry language information. According to modern scientific research, different speakers have different voiceprints no matter the speaker whispers softly or deliberately imitates the voice and tone of other person vividly; that is to say, the sizes and shapes of the vocal organs (such as the tongue, the teeth, the throat, the lungs, and the nasal cavity) used by the person to speak are different from that of other person, so any two speakers have different voiceprints, and it indicates that every person's voiceprint is unique. Furthermore, after adulthood, the person's voice can remain unchanged for a long time, so the person's voiceprint is also relatively stable.

According to different application scenarios, voiceprint identification technologies can be classified into speaker identification (SI) technology and speaker verification (SV) technology. The speaker verification technology is used to determine whether a segment of speech is made by a specific speaker; that is, by using the voiceprint verification technology, the speaker's voice can be used to determine the speaker's identity. However, the speaker's identity can be determined through voiceprint identification to exclude other person's imitation, but the voiceprint verification is unable to distinguish whether the voice is made by a real person or is played by an audio player. A person with malicious intent may record the voice of the speaker to obtain the voiceprint of the speaker in advance, so as to fake the voice of the speaker and then steal the identity of the speaker.

Therefore, what is needed is to develop an improved identity determination system to solve the conventional problem that the voiceprint verification technology cannot determine whether the inputted voice is made by a real person.

SUMMARY OF THE INVENTION

In order to solve the conventional problems that the conventional voiceprint verification technology cannot determine whether the inputted voice is made by a real person, the present invention provides a system for determining identity based on voiceprint and voice password, and a method thereof.

According to an embodiment, the present invention provides a system for determining identity based on voiceprint and voice password. The system comprises a voice receiving module, a voiceprint identification module, a voice identification module, a prompting module, and an operation executing module. The voice receiving module is configured to receive a first voice signal and a second voice signal. The voiceprint identification module is configured to determine whether a voiceprint of the first voice signal matches a pre-built target voiceprint. The voice identification module is configured to determine whether the first voice signal matches a predetermined command, and determine whether the second voice signal matches a voice password. The prompting module is configured to prompt for input of the second voice signal when the voiceprint identification module determines that the voiceprint of the first voice signal matches the pre-built target voiceprint and the voice identification module determines that the first voice signal matches the predetermined command. The operation executing module is configured to perform an operation corresponding to the first voice signal when the second voice signal matches the voice password.

According to an embodiment, the present invention provides a method for determining identity based on voiceprint and voice password. The method comprises steps of receiving a first voice signal; prompting for input of a second voice signal when a voiceprint of the first voice signal matches a pre-built target voiceprint and the first voice signal matches a predetermined command; receiving the second voice signal; and performing an operation corresponding to the first voice signal when the second voice signal matches a voice password.

According to above contents, the difference between the conventional technology, and the system and method of the present invention is that in the system and method of the present invention, after the voice signal is received, the judgment result of the voiceprint of the voice signal and the judgment result of the content of the voice signal are used to determine whether to pass the verification, so as to solve the conventional problems, and improve security in identity verification.

BRIEF DESCRIPTION OF THE DRAWINGS

The structure, operating principle and effects of the present invention will be described in detail by way of various embodiments which are illustrated in the accompanying drawings.

FIG. 1 is an architecture diagram of a system for determining identity based on voiceprint and voice password, according to an embodiment of the present invention.

FIG. 2A is a flowchart of a method for determining identity based on voiceprint and voice password, according to an embodiment of the present invention.

FIG. 2B is a flowchart of an operation of selectively performing warning based on an emotional status of the voice signal, according to an embodiment of the present invention.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

The technical solution of the present invention can be used to perform voiceprint identification and voice identification on a user's voice signal, so as to identify the user based on voiceprint, thereby prevent user's voiceprint from being forged or stolen.

The operation of the system for determining identity based on voiceprint and voice password of the present invention will be described below with reference to FIG. 1. As shown in FIG. 1, the system of the present invention includes a voice receiving module 110, a voiceprint identification module 131, a voice identification module 132, a prompting module 150, an operation executing module 160; in other embodiment, the system of the present invention can comprise at least one of an emotion assessment module 133, a warning module 170, an authorization determining module 180, and a password generating module 190.

The voice receiving module 110 is configured to receive a first voice signal, and also receive a second voice signal. The first voice signal and second voice signal are usually different voice signals that are inputted at different times. In other embodiment, the voice receiving module 110 may also receive a third voice signal.

In general, the voice receiving module 110 can use an external microphone or other voice input device (not shown in FIG. 1) to receive the first voice signal, the second voice signal, and the third voice signal; however, the present invention is not limited the above-mentioned examples.

The voiceprint identification module 131 is configured to determine whether a voiceprint of the first voice signal received by the voice receiving module 110 matches a prebuilt target voiceprint. The voiceprint identification module 131 can usually build the target voiceprint through the voice receiving module 110; however, the present invention is not limited to above-mentioned example.

The voice identification module 132 is configured to determine whether the first voice signal received by the voice receiving module 110 matches a predetermined command. The predetermined command is usually a pre-recorded voice signal, and the voice identification module 132 can convert the predetermined command into a command text, and convert the first voice signal received by the voice receiving module 110 into a voice text, and compare and check whether the voice text is the same as the command text, so as to determine whether the first voice signal matches the predetermined command; however, the present invention is not limited thereto, for example, the predetermined command can also be text data, the voice identification module 132 can compare the voice text, which is converted from the first voice signal, with the predetermined command, so as to determine whether the first voice signal matches the predetermined command.

The voice identification module 132 is also configured to determine whether the second voice signal received by the voice receiving module 110 matches the voice password. In general, the voice password is usually text data, the voice identification module 132 can convert the second voice signal into a voice text, and then compare and check whether the voice text matches the voice password; however, the present invention is not limited above-mentioned example.

The emotion assessment module 133 is configured to determine an emotional status according to the voiceprint of at least one of the first voice signal and the second voice signal received by the voice receiving module 110. The emotion assessment module 133 is able to determine that the emotional status indicates a normal emotional status, such as a usual emotion, a pleasant emotion, an angry emotion, or a sad emotion, and determine that the emotional status indicates an abnormal emotional status such as a fearful emotion or a scared emotion; however, the emotional status mentioned in the present invention is not limited to the above examples.

The emotion assessment module 133 can also check the emotional status according to the third voice signal received by the voice receiving module 110; that is, the emotion assessment module 133 can re-check whether the emotional status is abnormal according to the third voice signal. If the emotional status is still abnormal, the emotion assessment module 133 can confirm that the emotional status is abnormal; otherwise, if the rechecked emotional status is normal, the operation executing module 160 executes the corresponding operation normally. The emotion assessment module 133 can determine, according to the voiceprint of the third voice signal, whether the emotional status is abnormal, and also can determine, according to the content of the third voice signal, whether the emotional status is abnormal.

The prompting module 150 is configured to prompt for input of the second voice signal when the voiceprint identification module 131 determines that the voiceprint of first voice signal matches the prebuilt target voiceprint and the voice identification module 132 also determines that the first voice signal matches the predetermined command. The prompting module 150 can broadcast the pre-built voice message or display a pre-built text message to prompt for input of the second voice signal; however, the present invention is not limited to above-mentioned examples.

The prompting module 150 can also ask at least one question and prompt for input of the third voice signal corresponding to the at least one question when the emotion assessment module 133 determines that emotional status is abnormal. In an embodiment, the at least one question may be set in advance, and each question can correspond to a correct answer, and the emotion assessment module 133 can determine that the emotional status is normal when the content of the third voice signal matches the correct answer, and determine that the emotional status is abnormal when the content of the third voice signal does not match the correct answer. In an embodiment, each question can also have multiple corresponding answers, for example, each question can have an answer indicative of normal emotional status and an answer indicative of abnormal emotional status, and when the content of the third voice signal matches the answer indicative of normal emotional status, the emotion assessment module 133 determines that the emotional status is normal, and when the content of the third voice signal matches the answer indicative of abnormal emotional status, the emotion assessment module 133 determines that the emotional status is abnormal.

The operation executing module 160 is configured to determine the identification result passes verification when the voice identification module 132 determines that the second voice signal matches voice password, and the operation executing module 160 then performs the operation corresponding to the first voice signal, such as a specific function. When the voice identification module 132 determines that the second voice signal does not match the voice password, the operation executing module 160 determines that the identification result does not pass the verification, and does not perform the operation corresponding to the first voice signal.

The warning module 170 is configured to perform a warning operation when the emotion assessment module 133 determines that emotional status is abnormal, and the warning module 170 can also selectively perform a warning operation according to the third voice signal received by voice receiving module 110. The warning operation can be an action of calling the police or giving a ringing alarm; however, the present invention is not limited above-mentioned examples.

According to the voiceprint of the first voice signal received by the voice receiving module 110, the authorization determining module 180 can determine whether the operation corresponding to the first voice signal can be performed by the operation executing module 160. More detailed, the authorization determining module 180 can determine, according to the voiceprint of the first voice signal, the identity of the user making the first voice signal, and read the authority corresponding to the identified user's identity, to determine whether the identified user's identity is permitted to perform the operation corresponding to the first voice signal; that is, according to the read authority, the authorization determining module 180 can determine whether the operation corresponding to the first voice signal can be performed.

The password generating module 190 is configured to generate the voice password required by the voice identification module 132, and transmit the generated voice password to the specific device (not shown in figures). Preferably, the specific device can be an e-mail server, a mobile phone, and so on, but the present invention is not limited thereto. In general, the password generating module 190 can randomly generate the voice password, and can also generate the voice password according to specific rules; however, the present invention is not limited to above examples.

Next, the operations of system and method of the present invention are illustrated by an embodiment in reference with FIG. 2A, which is a flowchart of the method for determining identity based on voiceprint and voice password, according to the present invention. In this embodiment, the system and the method of the present invention can be applied to an electronic device such as a video player, a speaker, a mobile phone, a tablet, a screen, a safety box, and the like.

The electronic device can store the voiceprint of the owner in advance. In this embodiment, the voice receiving module 110 can receive the voice signal made by the owner, and the voiceprint identification module 131 can obtain the voiceprint of the owner according to the voice signal received by voice receiving module 110, and the obtained voiceprint is used as the target voiceprint.

When a user wants to operate the electronic device, the voice receiving module 110 can receive the first voice signal made by user regardless of whether the user is the owner or not (that is, step 210 of the method). In this embodiment, the voice receiving module 110 is electrically connected to a microphone of the electronic device, and the voice receiving module 110 can be maintained in the status of continuously receiving the voice signal, so as to receive the first voice signal input by the user through the microphone.

After the voice receiving module 110 receives the first voice signal in the step 210, the voiceprint identification module 131 can determine whether the voiceprint of the first voice signal received by the voice receiving module 110 matches the target voiceprint pre-built by the owner (that is, a step 220 of the method), and the voice identification module 132 can also determine whether the first voice signal received by the voice receiving module 110 matches the predetermined command (that is, a step 230 of the method). In actual application, there is no sequential order relationship between the step 220 in which the voiceprint identification module 131 determines whether the voiceprint of the first voice signal matches the target voiceprint pre-built by the owner, and the step 230 in which the voice identification module 132 determines whether the first voice signal matches the predetermined command; in an embodiment, the voice identification module 132 can determine whether the first voice signal matches the predetermined command in the step 230, and the voiceprint identification module 131 then determines whether the voiceprint of the first voice signal matches the target voiceprint pre-built by the owner in the step 220.

When the voiceprint identification module 131 determines that the voiceprint of the first voice signal does not match the target voiceprint pre-built by the owner, or the voice identification module 132 determines that the first voice signal does not match the predetermined command, the operation executing module 160 can determine that the identification result does not pass the verification, so the operation executing module 160 does not perform the operation corresponding to the first voice signal, for example, the operation of unlocking the electronic device. As a result, the user is unable to use electronic device. When the voiceprint identification module 131 determines that the first voice signal matches the target voiceprint pre-built by the owner and the voice identification module 132 determines that the first voice signal matches the predetermined command, the prompting module 150 can prompt for input of the second voice signal (that is, a step 241 of the method), and the voice receiving module 110 can then receive the second voice signal (that is, a step 245 of the method). In this embodiment, the prompting module 150 can broadcast the prompt message to prompt the user to input the preset voice password, so as to prompt user to say the voice password, and the voice receiving module 110 is ready to receive the second voice signal.

After the voice receiving module 110 receives the second voice signal from the user in the step 245, the voice identification module 132 can determine whether the second voice signal received by the voice receiving module 110 matches the voice password (that is, a step 250 of the method). When the voice identification module 132 determines that the second voice signal matches the voice password, the operation executing module 160 can determine the identification result passes the verification, and the operation corresponding to the first voice signal can be executed (that is, a step 295 of the method), for example, the electronic device can be unlocked to allow the user to operate; and, if the voice identification module 132 determines that the second voice signal does not match the voice password, the operation executing module 160 can determine that the identification result does not pass the verification, so the operation executing module 160 does not perform the operation corresponding to the first voice signal, for example, the operation of unlocking the electronic device cannot be performed, as a result, the user cannot use electronic device.

After the process of determining the user's identity based on the voiceprint, the system and the method of the present invention can further check whether the user makes the second voice signal carrying the voice password, so as to prevent the situation that the user stealing owner's voiceprint can use the electronic device.

In an embodiment, the electronic device can comprise the password generating module 190, and before or after the prompting module 150 prompts for input of the second voice signal in the step 241, and before the voice receiving module 110 receives the second voice signal in the step 245, the password generating module 190 can dynamically generate the voice password, and transmit the generated voice password to a specific device. In this embodiment, the specific device can be the owner's phone, and the password generating module 190 can randomly generate the voice password, and transmit the generated voice password to the owner's phone by text message, email, instant messaging, near field communication, and so on. As a result, when the user is the owner, user can obtain the voice password.

Furthermore, in an embodiment, the electronic device can comprise the emotion assessment module 133. As shown in the flow of FIG. 2B, after the voice identification module 132 determines that second voice signal matches the voice password, and before the operation executing module 160 determines the identification result passes the verification and performs the operation corresponding to the first voice signal in the step 295, the emotion assessment module 133 can determine, according to at least one of the first voice signal and the second voice signal received by the voice receiving module 110, whether the emotional status of the user is abnormal (that is, the step 260 of the method). When the emotion assessment module 133 determines that the emotional status of the user is normal, the operation executing module 160 determines that the identification result passes the verification, and the operation corresponding to the first voice signal can be performed (that is, a step 295 of the method), for example, the operation of unlocking the electronic device can be performed.

If the emotion assessment module 133 determines that the emotional status of the user is abnormal, the prompting module 150 asks at least one question (that is, a step 271 of the method), and provides the at least one question to the user, at the same time, the voice receiving module 110 is ready to receive the third voice signal made by user for answering the at least one question (that is, the step 275 of the method). In this embodiment, the at least one question can be pre-recorded by the owner. The prompting module 150 can broadcast the pre-recorded question, and the user says the answer to the question broadcasted by the prompting module 150, so that the voice receiving module 110 can receive the user's answer which is the third voice signal.

After the voice receiving module 110 receives the third voice signal in the step 275, the emotion assessment module 133 can determine, according to the third voice signal received by the voice receiving module 110, whether the emotional status of the user is abnormal (that is, a step 281 of the method). If the emotion assessment module 133 determines that the emotional status of the user is normal, the operation executing module 160 can determine that the identification result passes the verification, and the operation corresponding to the first voice signal can be performed (that is, a step 295 of the method), for example, this operation is unlocking the electronic device.

If the emotion assessment module 133 determines that the emotional status of the user is still abnormal, the warning module 170 can selectively perform the warning operation according to the content of the third voice signal received by voice receiving module 110 (that is, a step 285 of the method). In the embodiment, the at least one question can include a group of questions set in advance, and each question has an answer indicating that the emotional status is normal and an answer indicating that the emotional status is abnormal, and when the content of the third voice signal matches the answer indicating the normal emotional status, the warning module 170 can select to not perform the warning operation; or, when the content of the third voice signal does not match the answer indicating the normal emotional status, but the voiceprint of the third voice signal indicates that the user's emotional status is normal, the warning module 170 can select to not perform the warning operation; and if the third voice signal matches the answer indicating the abnormal emotional status, the warning module 170 can select to perform the warning operation, for example, the warning module 170 can alert or call an administrator or police.

In summary, the difference between the technology of the present invention and the conventional technology is that after the voice signal is received, the judgment result of the voiceprint of the voice signal and the judgment result of the content of the voice signal are used to determine whether to pass the verification, so as to solve the conventional problem that the voiceprint identification technology is unable to determine whether the voice is made by a real person; as a result, the security of identity determination can be improved.

Furthermore, the system for determining identity based on the voiceprint and the voice password, and the method thereof of the present invention can be implemented by hardware, software, or a combination of hardware and software, and can also be implemented in a centralized manner in a computer system or in a distributed manner in which different elements are distributed over several interconnected computer systems.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method for determining identity based on voiceprint and voice password, comprising:
   receiving a first voice signal;

prompting for input of a second voice signal when a voiceprint of the first voice signal matches a pre-built target voiceprint and the first voice signal matches a predetermined command;

receiving the second voice signal;

determining an emotional status according to the voiceprint of at least one of the first voice signal and the second voice signal, and performing a warning operation when the emotional status is abnormal;

asking at least one question when the emotional status is abnormal, and receiving a third voice signal corresponding to the at least one question, wherein each question can correspond to a correct answer;

selectively performing the warning operation according to the third voice signal, in a condition that the emotional status is confirmed to be abnormal when the content of the third voice signal does not match the correct answer; and performing an operation corresponding to the first voice signal when the second voice signal matching a voice password.

2. The method according to claim 1, before the step of receiving the second voice signal, further comprising:

generating the voice password, and transmitting the voice password to a specific device.

3. The method according to claim 1, before the step of performing the operation corresponding to the first voice signal, further comprising:

according to the voiceprint of the first voice signal, determining whether to perform the operation corresponding to the first voice signal.

\* \* \* \* \*